U nited States Patent Office 2,890,346
Patented June 9, 1959

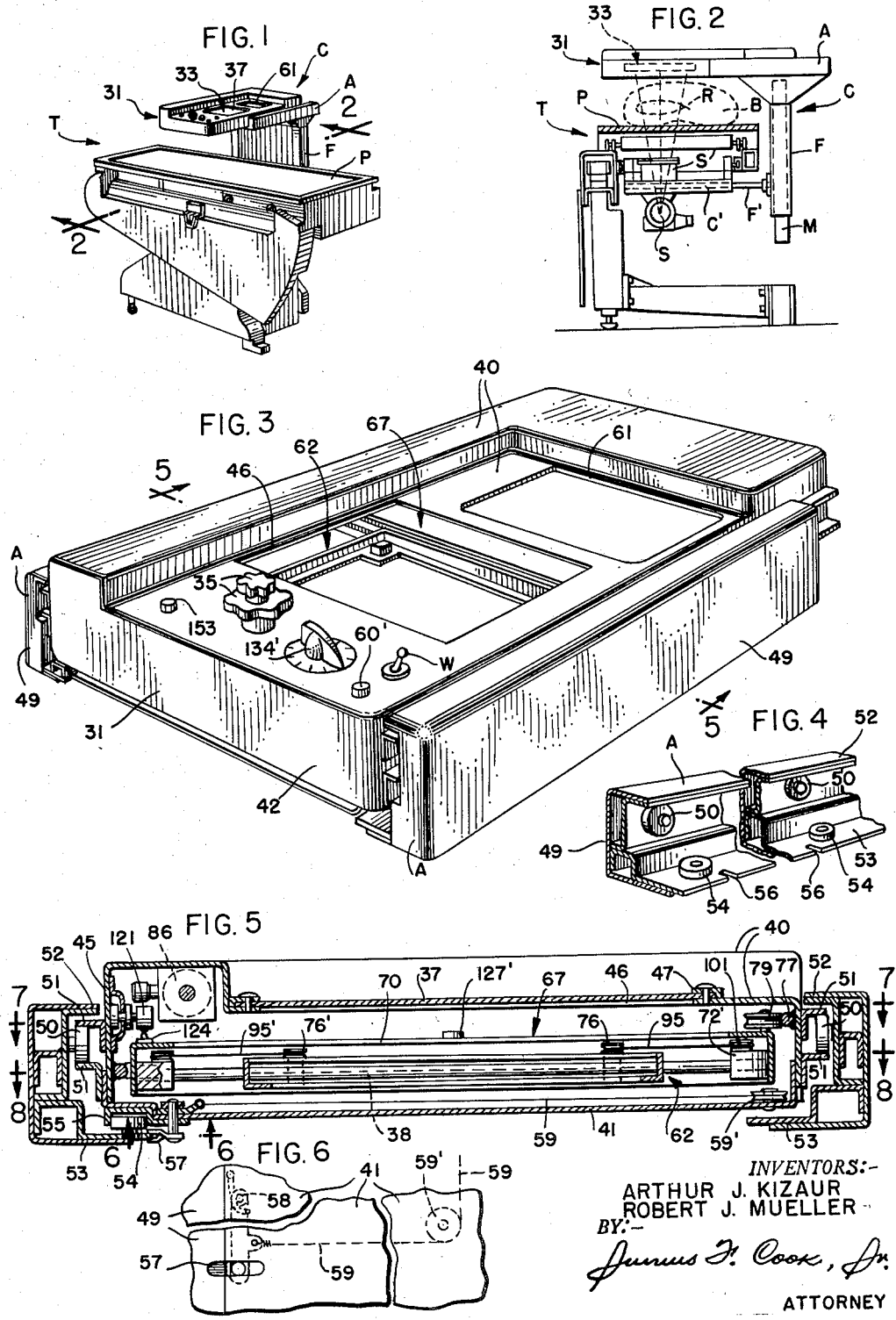

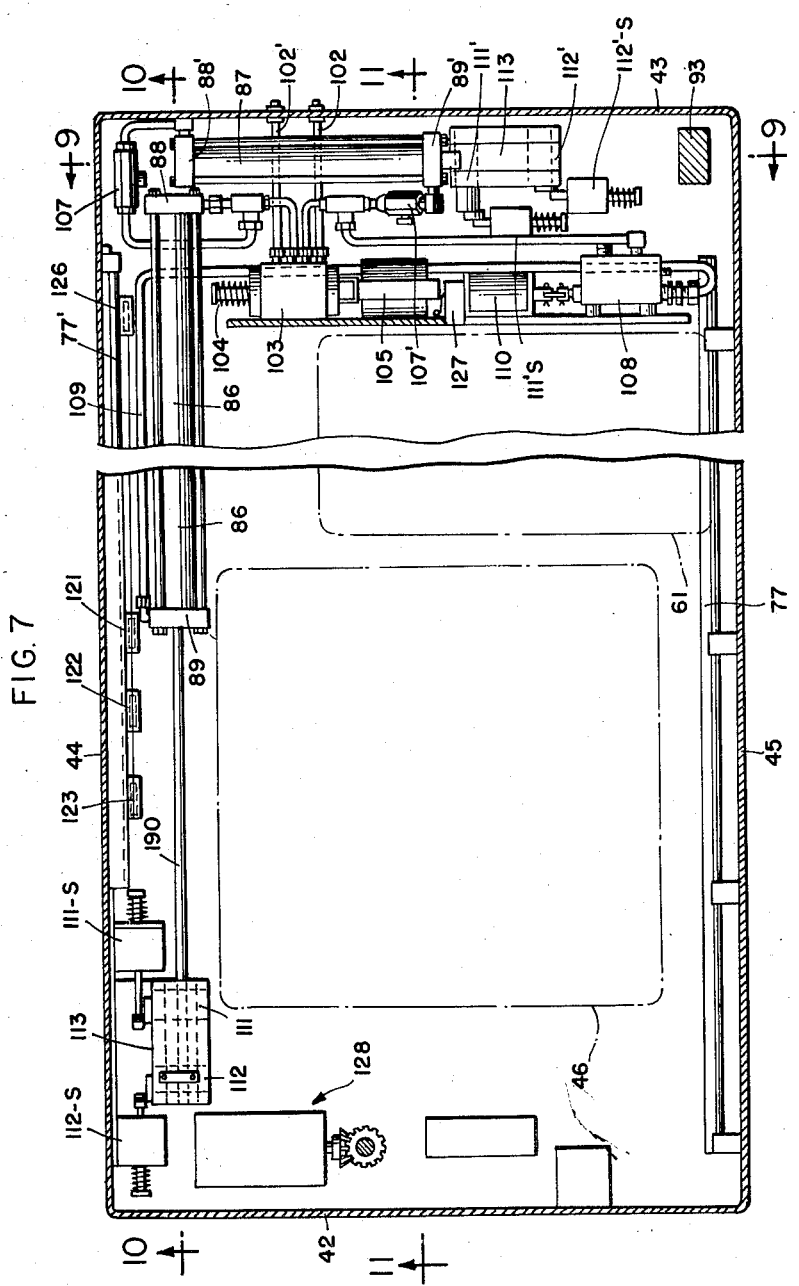

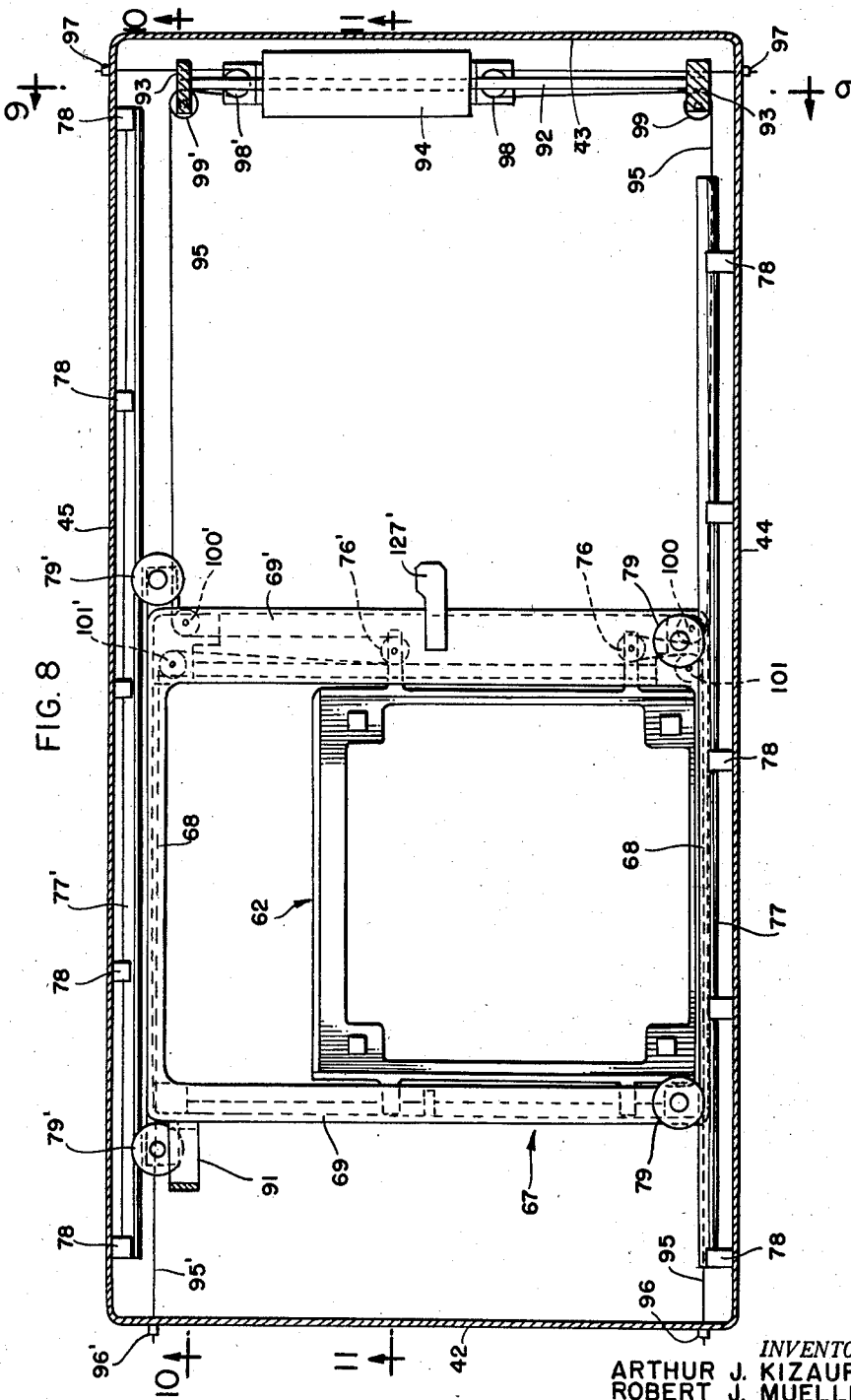

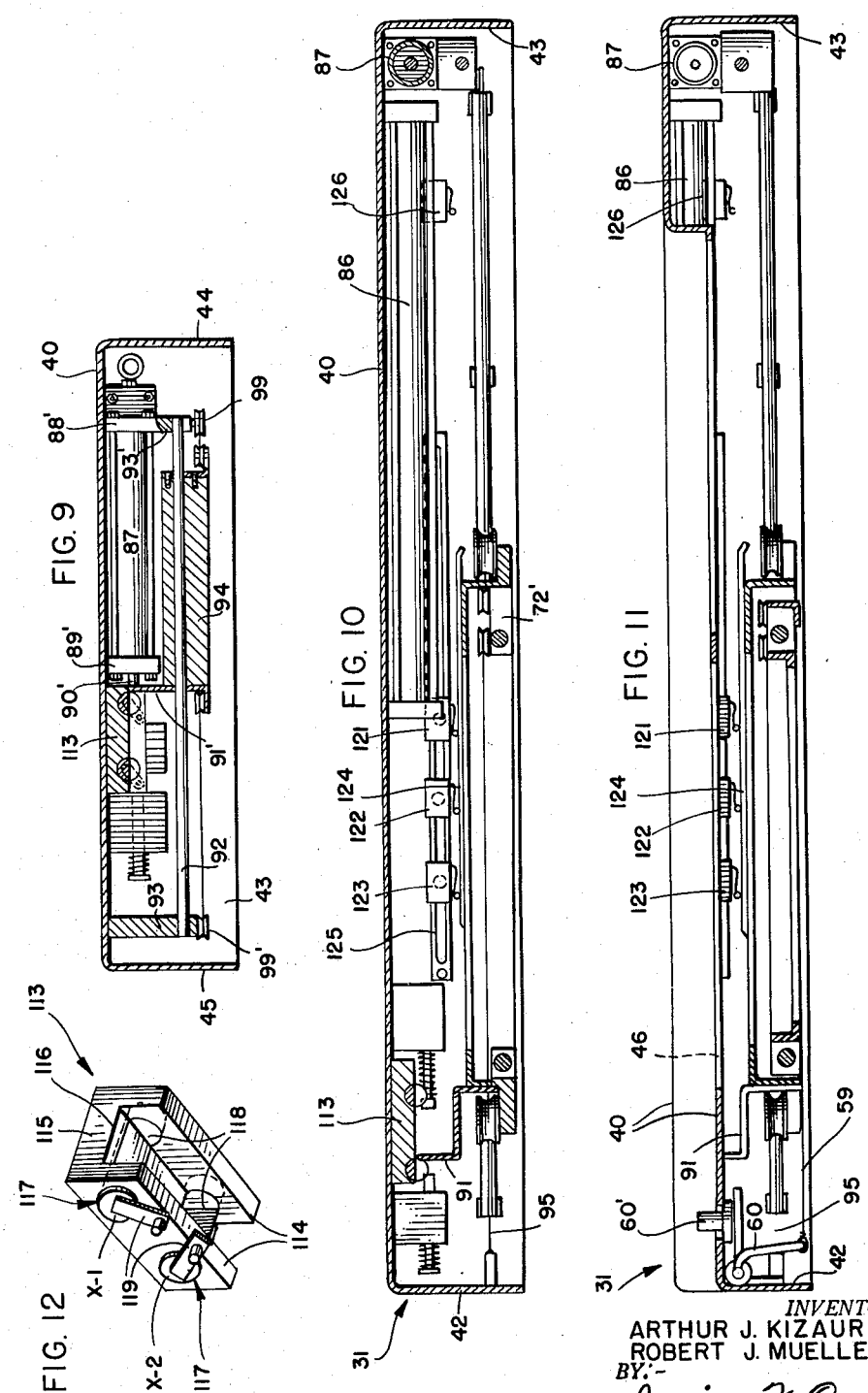

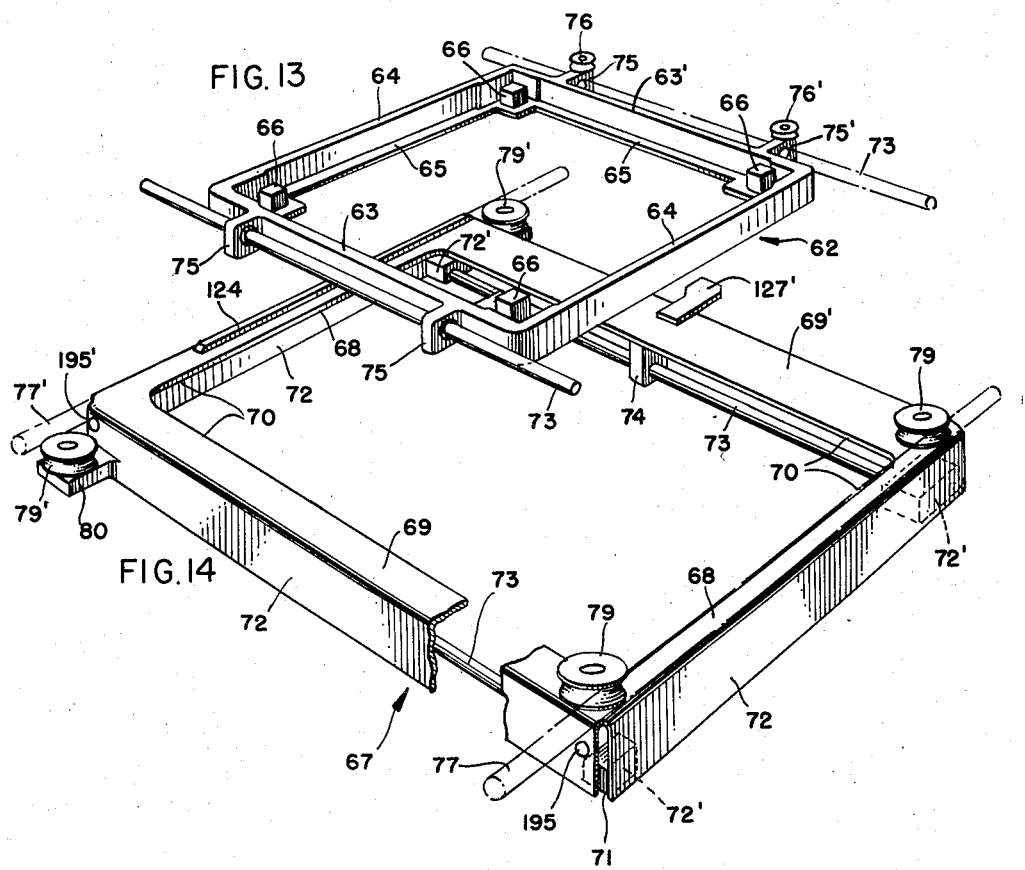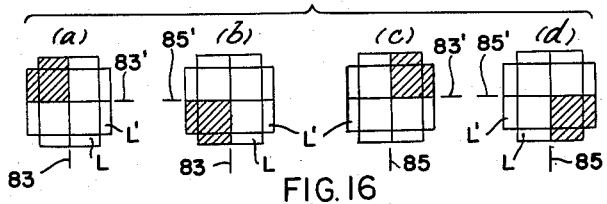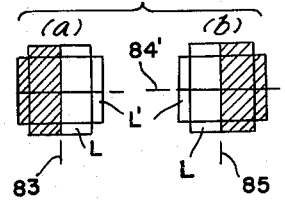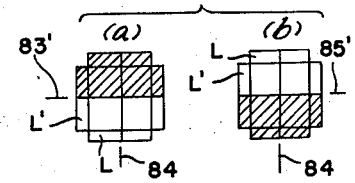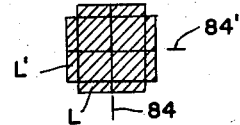

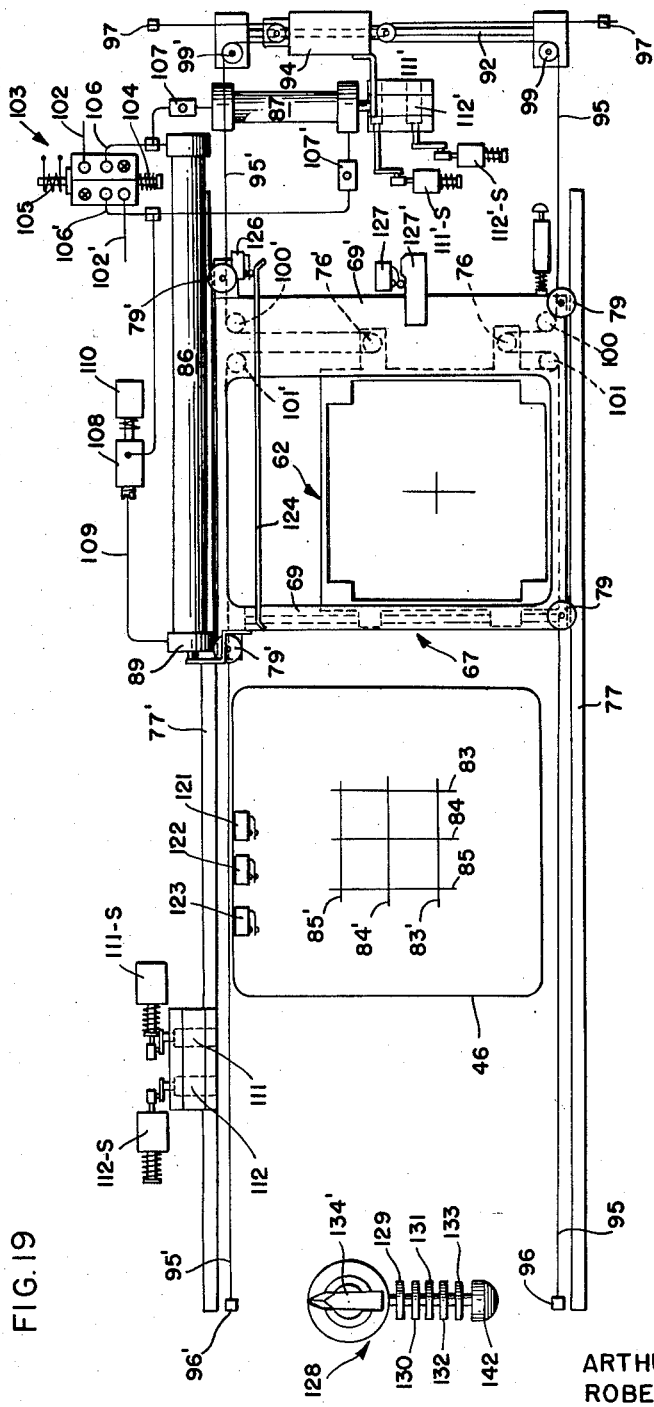

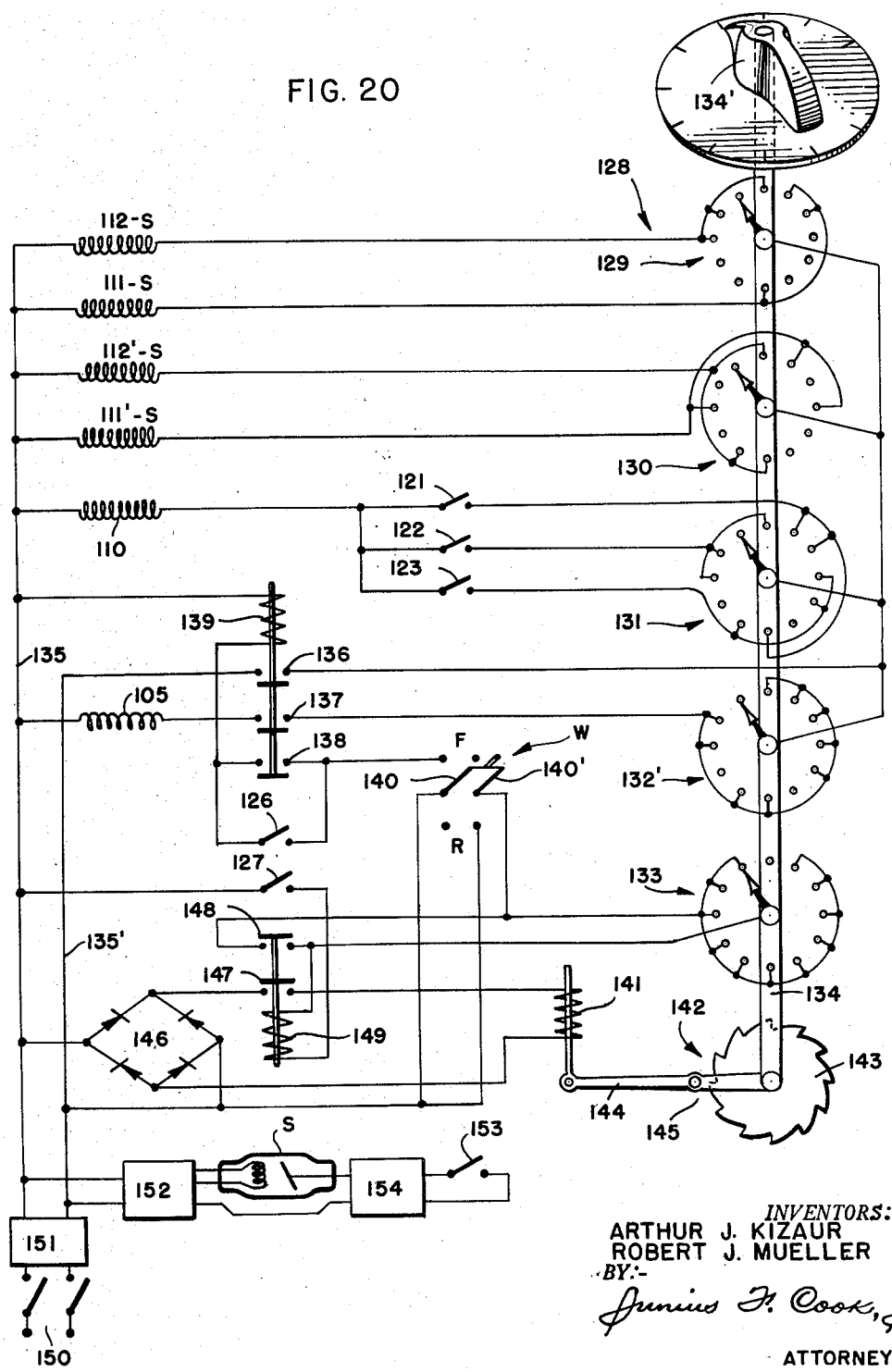

2,890,346

FLUID PRESSURE OPERATED SERIALOGRAPHIC APPARATUS AND EQUIPMENT EMBODYING SAME

Arthur J. Kizaur, Pewaukee, and Robert J. Mueller, Milwaukee, Wis., assignors to General Electric Company, a corporation of New York Application March 16, 1955, Serial No. 494,694

16 Claims. (Cl. 250—66)

The present invention relates in general to penetrating ray apparatus, and has more particular reference to mechanism for supporting and shifting ray sensitive sheets or plates for use in producing shadow pictures on ray sensitive screen or film material, as in X-ray photography and fluoroscopy.

An important object of the invention is to provide compact and relatively light-weight apparatus for supporting ray sensitive material, such as X-ray sensitive film, in position for exposure to penetrating rays in the making of photographs; a further object being to provide for shifting the supported material from an inactive retracted position to a projected picturing position; a still further object being to provide for shifting the supported material successively from retracted to a number of predetermined, relatively offset picturing positions, whereby to allow selected portions of the ray sensitive material to be successively exposed in a picturing ray beam; still another object being to provide apparatus readily adjustable to accomplish any selected one of several plate or film shifting cycles.

Another important object is to provide apparatus for progressively shifting a plate, sheet, or film of ray sensitive material successively to a number of predetermined, relatively displaced exposure positions forming a plate shifting cycle; a further object being to provide mechanism selectively adjustable to shift a plate or sheet of ray sensitive material through any selected one of a number of different plate shifting cycles.

A further object of the invention is to provide sensitive film or plate shifting apparatus which will accomplish the shifting operation between retracted and projected picturing positions rapidly and substantially without vibration or jar.

Another important object is to provide apparatus of the character mentioned, which is of relatively simple, inexpensive construction and light in weight, whereby the same may be readily supported, as on a diagnostic table, and easily shifted to thereby facilitate the positioning of the apparatus for the making of penetrating ray photographs.

Another important object is to provide mechanism of the character mentioned embodying a screen of material adapted to become luminescent upon exposure to penetrating rays, such as X-rays, whereby to visually examine an object exposed to rays passing therethrough and impinging upon the screen, in combination with ray sensitive film or plate carrying means normally disposed in retracted position outwardly of the zone of said screen, said carrying means being operable at will to project said plate or film into registration with said screen for the purpose of making a penetrating ray photograph of an examination object substantially instantaneously after viewing the same on the screen.

Another important object is to provide fluid pressure means for shifting ray sensitive material.

Another object is to provide apparatus for projecting a sheet, layer, or plate of sensitive material into position for over-all exposure, or into positions to successively expose each half of the layer, on opposite sides of its center line, or into positions successively to expose the several quarter sections of the layer.

Another important object is to provide mechanism for projecting ray sensitive material from retracted to exposure position, comprising a main carriage movable in one direction from retracted position to any selected one of a number of relatively offset projected positions, and an auxiliary carriage adapted to support the sensitive material and movable on the main carriage, during projection thereof, to any one of a number of adjusted positions, on the main carriage and transversely of the direction of projecting movement thereof.

Another important object is to provide fluid pressure means operable to present a layer of ray sensitive material successively in a plurality of relatively shifted exposure positions, whereby to photograph several related pictures of an examination object upon adjacent portions of the same sensitive layer, sheet, or plate.

Another important object is to provide fluid pressure operated apparatus for successively projecting a sensitive film or plate carrier from retracted to picturing positions, the apparatus being self adjusting to successively present adjacent portions of the film or plate in position for picturing exposure.

Another important object is to provide carriage driving mechanism of the character mentioned for adjustably projecting a main carriage in one direction, while adjustably shifting an auxiliary carriage on the main carriage in a direction transversely of the projecting movement of the main carriage.

Another important object is to provide fluid pressure operated means for projecting a carriage from retracted to any selected one of a plurality of relatively offset projected positions, including means for stopping the carriage precisely in the selected projected position; a further object being to thus provide fluid pressure operated means for projecting a main carriage to a desired projected position, and for adjustably shifting an auxiliary carriage, on the main carriage, during projection thereof, to any selected one of a plurality of adjusted positions transversely of the direction of projecting movement of the main carriage; a still further object being to provide separate fluid pressure piston and cylinder structures for projecting the main carriage while simultaneously adjusting the position of the auxiliary carriage on the main carriage; a still further object being to utilize fluid under relatively high pressure for so projecting the carriages, and fluid under relatively low pressure for returning the carriages to retracted position.

Another important object is to employ fluid under relatively low pressure for the purpose of braking the projecting movement of the carriages; a further object being to employ selectively operable mechanical stop latches for halting the projecting movement of the carriages when the same reach selected projection positions.

Another important object is to provide electrically actuated valve means for controlling the operation of the fluid pressure actuated carriage projecting devices, and to employ electrically controlled stop latches for determining the projected positions of the carriages; a further object being to provide selectively adjustable means for controlling the operation of the valves and stop latches in desired fashion.

The foregoing and numerous other important objects, advantages, and inherent functions of the invention will become apparent as the same is more fully understood from the following description, which, taken in connection with the accompanying drawings, discloses a preferred embodiment of the invention.

Referring to the drawings:

Fig. 1 is a perspective view of X-ray apparatus embodying the present invention;

Fig. 2 is a sectional view taken substantially along the line 2—2 in Fig. 1;

Fig. 3 is an enlarged perspective view of a portion of the apparatus shown in Fig. 1;

Fig. 4 is a fragmentary perspective view of a portion of the apparatus shown in Fig. 1;

Fig. 5 is a sectional view taken substantially along the line 5—5 of Fig. 3;

Figs. 6, 7 and 8 are sectional views respectively taken substantially along the lines 6—6, 7—7 and 8—8 in Fig. 5;

Figs. 9, 10 and 11 are sectional views respectively taken substantially along the lines 9—9, 10—10 and 11—11 in Figs. 7 and 8;

Fig. 12 is a perspective view showing selectively operable stop means employed in the mechanism;

Figs. 13 and 14 are perspective views of an auxiliary carriage and a main carriage on which the auxiliary carriage is mounted, said carriages forming a part of the mechanism shown in Figs. 3, 5, 8, 10 and 11;

Figs. 15, 16, 17 and 18 are diagrammatic views illustrating serialographic operation of the mechanism; and Figs. 19 and 20 respectively are diagrammatic views showing electrical and fluid pressure connections.

To illustrate the invention, the drawings show a table structure T providing a table top panel P for supporting an object or body B to be examined, and carriage means C for supporting a suitable source S of penetrating rays, such as X-rays R, on one side of the panel P, said carriage means serving also to support a frame 31 carrying ray sensitive picturing means 33 on the side of the panel P remote from the source S, whereby penetrating rays R directed, from the ray source, through the panel and an examination object B supported thereon, may excite the sensitive picturing means 33 for the production of shadow pictures therein. As shown, the carriage means C may comprise a frame F disposed alongside of the table structure and having portions F' extending beneath the table top for supporting the ray source S thereunder, said frame portions being preferably mounted in a sub-carriage C' supported in the table structure for adjustment longitudinally of the top panel.

To that end, the frame portions F' may form a mounting for the ray source S which, in the illustrated embodiment, comprises an X-ray generating tube enclosed within a shockproof casing, the casing being secured on the frame portions F' in position such that X-rays, emitted by the tube when electrically energized for ray production, may be directed vertically upwardly toward the top panel P. The frame portions F' may also support a shutter box S' through which the rays R are directed from the source S toward the top panel P, said shutter box being adjustable to control the sectional size and shape of the beam comprising the rays R.

The shutter box S' may comprise material substantially opaque to the penetrating rays R, and may be formed with an open top fitted with suitable shutters defining an aperture through which rays from the source may pass. Preferably, four shutters are employed, two of which are adapted to open and close in a direction longitudinally of the table structure, while the remaining two shutters may open and close in a direction transversely of the table structure, shutter operation being accomplished by suitable mechanism for shifting the laterally and longitudinally adjustable shutters, as by the manual operation of control handles or knobs 35, which may be mounted in convenient position for manipulation, as on the frame 31.

To support the frame 31 in position presenting the picturing means 33 in alinement with rays emitted from the source S, the frame F may extend upwardly of the top panel, at a side thereof, and may comprise a rectangular structure forming preferably roller trackways for supporting a mounting frame M in said trackways, for adjustable movement on the frame F in a direction at right angles with respect to the plane of the table top panel P. The mounting frame M may carry a pair of spaced apart support arms A extending above the top panel P for carrying the frame 31 on and in position extending between said support arms. The carriage structure C is thus movable longitudinally of the table structure from one end thereof to the other, to thereby present the ray source S and the sensitive picturing means 33 in any adjusted position longitudinally of the panel P. The carriage means C is also adjustable laterally of the top panel P, by movement of the frame portions F' in the sub-carriage C', to thereby adjust the ray source and sensitive picturing means in a direction laterally of the panel P.

It will be obvious, of course, that the ray source and the ray sensitive means may be mounted on separate, independently operable carriage structures, and that said source and sensitive means may be mounted on carriage structures supported otherwise than on the table structure, although certain advantages and conveniences result from the mounting of the ray source and the sensitive picturing means upon a common carriage structure and by mounting the carriage means C with the table structure on a common support.

The ray sensitive means 33 may comprise a fluorescent panel or layer 37 adapted to become visibly luminous in response to ray excitation, whereby to provide a visible shadow picture of the object being examined; and the ray sensitive means may additionally comprise ray sensitive sheet material, such as preferably cassette enclosed photographic film 38, adapted, upon exposure to penetrating rays from the source S, to receive a latent photographic image of the examination object, such image being susceptible of subsequent development to produce a visible shadow picture of the object in the photographic film.

The present invention contemplates the provision of means substantially instantly operable to selectively present either the fluorescent screen 37 or a ray sensitive sheet or film 38 in position for picture making purposes, at a picturing station, in the frame 31, in vertical alinement with the beam of penetrating rays R. To this end, the support frame 31 may comprise a housing of generally elongated rectangular configuration and of hollow, box-like, preferably sheet metal construction embodying top and bottom walls 40 and 41, front and rear end walls 42 and 43, and opposed side walls 44 and 45.

The top wall 40, in the forward portions thereof, may be formed with a preferably rectangular opening 46 for receiving the fluorescent panel 37. This panel may be mounted in said opening in any suitable, preferred or convenient fashion, as by means of a binding frame 47 secured to and around the edges of the panel 37 and fastened to the top wall of the frame, at and around the edges of the opening 46. The lower wall 41 of the frame, opposite the opening 46, may also be formed with an opening, if desired. Such opening may be closed by a panel of material substantially transparent to the penetrating rays R. It is, however, preferable to form the bottom wall of the frame of a thin sheet of metal of uniform thickness, without any opening therein, the material of said bottom wall 41 being substantially transparent to the penetrating rays R. It is also desirable to apply a layer of ray impervious material, such as lead, upon the bottom wall 41 and to form said layer with an opening in registration with the picturing zone defined by the screen 37, to thereby exclude ray penetration within the housing 31 except at said picturing zone.

To mount the housing 31, the arms A may each comprise a light-weight yet rigid bar 49 formed of sheet metal channel elements secured together, as by welding, and provided each with spaced apart rollers 50, the opposite sides 44 and 45 of the housing 31 being provided each with a pair of outwardly projecting flanges 51 extending longitudinally of the housing end and spaced apart to receive the rollers 50 therebetween. The housing may thus be mounted for longitudinal adjustment on the bars 49 in a direction transversely of the table top panel P. If desired, of course, the suspension of the frame 31 on the bars 49 could be accomplished by providing rollers, like the rollers 50, in spaced relation on opposite sides of the housing 31, in position to fit between and rollingly engage track forming flanges, like the flanges 51, formed on the bars 49.

The bars 49 may each include an inturned flange 52 in position to extend substantially in the plane of the top wall 40 of the housing 31, said flanges 52 overlying and enclosing the wheels 50 and the track forming flanges 51, the inner edges of the flanges 52 extending in closely spaced relationship with the opposite longitudinal sides 44 and 45 of the housing. The bars 49 may also include inwardly projecting flanges 53 in position extending beneath the opposite side edges of the housing 31. The flange 53 of at least one of the members 49 may carry spaced rollers 54 in position to rollingly engage track forming means on and extending longitudinally of the housing. Said track forming means may conveniently comprise a channel member 55, secured on the bottom of the housing 31, at and along one side thereof, said track forming channel member providing a pair of spaced apart dependent flanges in position to engage opposite sides of the rollers 54.

The housing 31 is thus supported for sliding movement longitudinally with respect to the bars 49. As a consequence, the housing 31 may be supported in any one of a number of adjusted positions, including a retracted, inoperative position in which the picturing zone defined by the panel 37 is disposed above the side of the table adjacent the frame F. When in such retracted position, the zone above the table top panel will be substantially unobstructed. The housing 31, however, may be moved on the bars 49 to active or projected position presenting the picturing zone, defined by the panel 37, in vertical alinement with the ray beam R.

Suitable latch means may be provided for securing the housing 31 in retracted and in projected positions. To this end, one of the bars 49 may be formed, as at an edge of its flange portion 53, with spaced latching notches 56 in position to be engaged by a latching detent 57 on and movable with the housing 31 and normally urged, as by means of a spring 58, to press upon the edge of the flange 53 and to latchingly engage the notches 56 when the housing is in retracted and in projected positions. Manually operable means may be provided on the housing, as at the forward portions of the top wall 40 thereof, for retracting the detent 57 when required to release the latch to permit the housing to be moved from retracted to projected position, or vice versa. To that end, a flexible cable 59, guided on a pulley wheel 59', may be provided for connecting the detent with a bell crank lever 60 mounted in the frame 31 at the forward end thereof. A push button switch 60' may be mounted in readily accessible position on the housing 31, as at the forward end of its top wall 40, to move the bell crank 60 for release of the detent in response to manual depression of the push button.

The housing 31 thus may be moved in the guiding and supporting channels 49 either to an operable position presenting its picturing zone in alinement with the ray source S, or to a retracted, inactive position out of alinement with said source and on one side of the table structure. The housing 31 may also be adjusted to any desired elevation above the table top panel P by shifting the support structure, including the frame M, on the frame F. Likewise, the frame F may be moved laterally of the table top panel P, within limits determined by the maximum relative movement of the frame portions F', with respect to the sub-carriage C'; and the entire carriage structure C, including the housing 31, may be adjusted longitudinally of the table structure within a range determined by the maximum displacement of the sub-carriage C' longitudinally of the table structure. Accordingly, the picturing zone defined by the panel 37 may be adjusted for operation opposite any selected zone or portion of the table top panel P. It will also be obvious that, by shifting the housing 31 to its retracted position and by moving the frame F on the sub-carriage C' in a direction transversely of the table structure and outwardly of the unobstructed side thereof, the housing 31 and its supporting structure may be moved entirely from above the table top panel P to leave the same entirely unobstructed.

It will be seen from the foregoing that the housing 31 and its supports may be so arranged that when the same is in the projected operating position on the bars 49 and latched in place, the geometrical center of the panel 37 may be disposed in vertical registration with respect to the ray source S, regardless of the lateral and longitudinal adjustment of the carriage means C with respect to the table. As a consequence, by energizing the ray source S in any suitable, preferred or conventional fashion, fluoroscopic examination of any portion of an object supported on the table may be accomplished merely by moving the carriage means C to dispose the ray source and the panel 37 in alinement with such portion of the examination object desired to be viewed on the panel 37.

The housing 31 also contains mechanism for supporting ray sensitive sheet material, such as photographic film, in a retracted or stand-by position, at a loading station preferably disposed in the rear portions of the housing 31, said mechanism being operable to project the sheet material from said stand-by position into the picturing zone immediately beneath the fluorescent panel 37, in order to permit ray pictures of the examination object to be made on said sensitive sheet material by exposure thereof to picturing rays at the picturing station. The mechanism is also preferably operable to retract the sheet material to said stand-by position at the loading station after exposure of the material. The mechanism for so supporting, projecting and retracting sensitive sheet material may comprise a cassette carrier or carriage 62 adapted to receive and support a cassette of any suitable, preferred or conventional structure, providing a light-tight enclosure for ray sensitive film material, and means for retracting and normally holding the cassette carrier 62 in retracted or stand-by position opposite a preferably rectangular carriage loading opening 61, in the top wall 40, of the housing 31, through which opening access to the interior of the housing may be had. When in such retracted position, a cassette may be loaded into or removed from the carriage 62 through the opening 61.

The cassette carrier preferably comprises a light-weight rectangular frame which, if desired, may be formed as a die casting of light-weight metal, such as aluminum; or the frame may comprise formed sheet metal parts. The frame preferably comprises upstanding peripheral walls, including front and rear walls 63 and 63', side walls 64, and inwardly projecting seat forming flanges 65, on said front, rear and side walls, for receiving the opposite ends of a cassette to support the same in the frame. Ray sensitive film and film cassettes are normally of rectangular shape and of somewhat greater length than width. While the cassette carrier 62 may likewise be of greater length than width to snugly accommodate a conventional cassette, said carriage preferably has square configuration to receive a conventional cassette therein in either one of two positions L and L' extending mutually at right angles, the corners of the carrier being provided with abutments 66 for engaging the opposite sides of a cassette, at the opposite ends thereof, to center the same in the carrier in both of such mounted positions.

The cassette carrier 62 may be supported and carried shiftably on a carriage frame 67 which may be formed as a die casting of light-weight metal, such as aluminum; or the frame 67 may comprise sheet metal parts, including side members 68 forming the opposite sides of the frame 67, and front and rear members 69, 69' bracing and interconnecting the opposite ends of the side members 68. The members 68 and 69 may be formed from a single sheet or plate of metal of rectangular configuration provided with a central, generally rectangular opening 70 and corner notches 71, the marginal edges of the plate between the corner notches being bent downwardly to provide dependent flange portions 72 on the front, rear and side members of the frame. If desired, the flanges 72 may be rigidly interconnected at the corners of the frame 67, as by means of brackets 72' secured to the meeting ends of said flanges.

While any suitable or preferred means, such as tracks and track engaging rollers, may be provided for mounting and supporting the cassette carrier 62 upon the carriage frame 67, the same, as shown, is preferably provided with a pair of carriage supporting rails 73, comprising rods extending beneath the front and rear members 69 and 69' of the frame 67. The opposite ends of the rods 73 may be secured to the brackets 72', or otherwise suitably fastened to the flanges 72 which depend from the side members 68 of the frame. The medial portions of the rods 73 may extend through and be secured in mounting lugs 74 mounted on and extending beneath the front and rear frame members 69 and 69'. The cassette carrier 62 also may be formed with outstanding, spaced apart lugs 75 and 75' respectively on its front and rear members 63 and 63', said lugs being disposed adjacent the corners of the carriage and perforated to slidingly receive the rods 73 therethrough, whereby the cassette carriage 62 may move freely with respect to the carriage frame 67 between the opposite ends thereof in a direction transversely of the main frame 31. The lugs 75' at the rear side of the cassette carriage may each support a pulley wheel 76 thereon for purposes hereinafter more fully explained.

Means may be provided for supporting the carriage frame 67 for movement on and longitudinally of the main frame 31 between a retracted position in the rearward portions of said main frame opposite the opening 61 and a projected position in the forward portions of the frame in alinement with the opening 46 at the picturing station. To this end, a pair of spaced apart track forming rods 77 and 77' may be mounted and supported, as by means of brackets 78, on the opposite side walls 44 and 45 of the main frame 31. The rail 77' may be supported on the wall 45 adjacent the lower edge thereof, while the rail 77 may be supported adjacent the top of the wall 44.

The carriage frame 67 may be provided on one side with spaced apart rollers 79 in position to rollingly engage the rail 77, said rollers being preferably mounted on axles secured on the carriage frame in position extending upwardly thereof. The carriage frame 67 may also be provided with a pair of spaced apart rollers 79' disposed at the corners of the carriage frame remote from the rollers 79, said rollers 79' being preferably mounted on support lugs 80 formed on the flange portions which depend from the front and rear frame members 69 and 69', said rollers 79' being thus presented in position to rollingly engage the rail 77'.

It will be seen from the foregoing that the cassette carriage structure, including the carriage frames 62 and 67, is movable longitudinally within the housing 31 by action of the rollers 79 and 79' on the track forming rods 77 and 77'. It will be seen, also, that the cassette carrier 62 is movable on the carriage frame 67 in a direction transversely of the longitudinal movement of the carriage frame 67 in the housing 31. By suitably controlling the longitudinal movement of the carriage frame 67, in the housing 31, and the transverse movement of the cassette carrier 62 on the carriage frame 67, any desired portion of a cassette enclosed layer or film of ray sensitive material may be centered in the picturing station beneath the panel 37. It will also be seen that by successively adjusting the relatively shifted positions of the frames 62 and 67, various adjacent zones of a cassette enclosed layer of ray sensitive material may be successively centered for exposure in the picturing station. Such operation, of course, may be accomplished with a cassette supported in the carriage 62 in either of the two cassette positions L and L'.

In this connection, the four views, a, b, c and d, comprising Fig. 15, illustrate the successive exposure of the quarter sectional areas of a light sensitive sheet, by adjusting the relative positions of the carriage frames 62 and 67, respectively transversely of the carriage frame 67 and longitudinally of the housing 31, in order to dispose such areas successively in centered position at the picturing station. The two views a and b, comprising Fig. 16, illustrate the successive exposure of transverse half sectional areas of a cassettte enclosed light sensitive sheet, while the views, a and b, comprising Fig. 17, illustrate the successive exposure of longitudinal half sectional areas of a cassette enclosed light sensitive sheet, by appropriate adjustment of the relative positions of the cassette carrier 62 and the carriage frame 67. The exposure of the entire area of a cassette enclosed sensitive sheet, when disposed in centered position at the picturing station, is illustrated in Fig. 18.

In order to selectively attain the several exposure positions of cassette enclosed ray sensitive material as illustrated in Figs. 15–18, means is provided for selectively projecting the carriage frame 67 from its retracted or stand-by position, opposite the opening 61, to any one of three projected positions in the picturing zone, including a centered position in the exposure station, indicated by the line 84 in Figs. 7, 16 and 18, and offset positions, on opposite sides of the centered position, as illustrated by the lines 83 and 85 in Figs. 7, 15 and 17. Means is also provided for positioning the cassette carriage 62 selectively in any one of three positions of adjustment laterally of the carriage frame 67, including a centered position in the exposure station, as indicated by the line 84', in Figs. 7, 17 and 18, and offset positions, on opposite sides of the centered position, as illustrated by the lines 83' and 85' in Figs. 7, 15 and 16.

In order to thus shift the carriages 62 and 67 and stop the same in accurately adjusted positions at the picturing station, the present invention provides selectively operable fluid pressure actuated mechanism mounted in the main frame 31 and drivingly connected with the carriages 62 and 67. Said mechanism, as shown more particularly in Figs. 7 and 9, may comprise a pair of fluid pressure actuating devices 86 and 87, respectively connected to shift the carriage frame 67 longitudinally on the tracks 77 and 77', and to shift the cassette carriage 62 on the tracks 73 transversely of the carriage frame 67. The fluid pressure devices 86 and 87 may comprise fluid pressure cylinders and associated pistons adapted to be driven longitudinally of the cylinders and drivingly connected with the carriage frames 62 and 67. The fluid pressure cylinder comprising the device 86 may be disposed in the frame 31 in position extending longitudinally thereof, preferably in the upper portions of said housing adjacent the housing wall 45. The cylinder embodies a pair of heads 88 and 89, at its opposite ends, and contains a longitudinally movable piston connected with a rod 90 extending outwardly of the cylinder at one end thereof, as through the head 89.

The fluid pressure cylinder comprising the device 87 may be disposed in the frame 31 in position extending transversely thereof, preferably in the upper portions of said housing adjacent the housing wall 43. The cylinder embodies a pair of heads 88' and 89', at its opposite ends, and contains a longitudinally movable piston connected with a rod 90' extending outwardly of the cylinder at one end thereof, as through the head 89'.

The piston remote end of the rod 90 may be secured to a bracket 91 which is fastened to the carriage frame 67, preferably at the end of the front frame member 69 adjacent the roller wheel 79'. Actuating fluid delivered in the device 86 to move the associated piston therein may serve to shift the carriage frame 67 longitudinally of the main frame along the tracks 77 and 77'.

Means is provided for drivingly connecting the piston connected rod 90' of the device 87 with the cassette carrier 62 so that the adjusted position of the cassette carrier, transversely of the carriage frame 67, may be controlled by the position of the piston rod 90'. To this end, the main frame 31 may be provided with a transverse bar 92 having opposite ends supported in suitable brackets 93 in position extending beneath the fluid pressure device 87, adjacent the rear wall 43 of the main frame. The bar 92 may form a guide track on which a frame 94, of mass substantially equal to that of the cassette carriage 62, may be mounted for sliding movement longitudinally of the track bar 92. The piston rod 90' may be drivingly connected with the frame 94, as by means of a bracket 91' secured to the frame 94 and fastened to the piston rod 90' so that the frame 94 may be drivingly moved on the track bar 92 in response to fluid pressure actuated movement of the piston rod 90'.

The frame 94 may be drivingly connected with the cassette carrier 62 by means of flexible cables 95 and 95', each having an end secured to the housing 31 by means of suitable cable anchors 96 and 96', at the forward end of the housing, as at the housing wall 42, the opposite ends of the cables 95 and 95' being secured, as by means of anchors 97 and 97', at the rearward end of the housing. The frame 94 may be provided with cable pulleys 98 and 98', at the opposite ends thereof, and said cables, respectively, from the anchors 97 and 97' may extend around the pulleys 98 and 98', thence around pulleys 99, 99' mounted inwardly of the opposite side walls 44 and 45 of the housing 31, as on the brackets 93. From the pulleys 99 and 99' the cables 95 and 95' may extend to and around pulleys 100 and 100' mounted, as on the brackets 72, at the opposite ends of and beneath the back side member 69' of the carriage frame 67, and thence around the pulleys 76 and 76' on the cassette carrier 62. From the pulleys 76 and 76', the cables 95 and 95' may pass around pulleys 101 and 101' mounted, as on the brackets 72, adjacent the pulleys 100 and 100' beneath the underside of the back member 69' of the carriage frame, the cables 95 and 95' passing thence to the anchors 96 and 96' at the front end of the housing. The dependent flanges 72 on the members 69 and 69' of the carriage frame 67 may be formed with openings 195 and 195' to accommodate the cables 95 and 95'.

By virtue of the foregoing arrangement, it will be seen that the cassette carrier 62 will move transversely on the carriage frame 67 in response to movement of the frame 94 on the track bar 92. Since the mass of the frame 94 is substantially equal to that of the cassette carrier 62, the weights of the frame and cassette carrier will be counterbalanced upon opposite sides of a medial plane extending longitudinally of the housing 31 at right angles to its top wall 40.

A suitable fluid actuating medium, such as air, may be delivered to the piston-cylinder devices 86 and 87 through suitable selectively operable fluid flow control means. The fluid medium is preferably delivered to the devices 86 and 87 under relatively high pressure in order to project the piston connected rods 90 and 90' outwardly, while the actuating fluid preferably under relatively low pressure may be applied in the devices for the retraction of the piston connected rods. To this end, actuating fluid may be delivered from relatively high and low pressure supply sources, as through suitable high and low pressure delivery conduits 102, 102', to a control valve 103 selectively operable to deliver actuating fluid at high or low pressure to the devices 86 and 87. The valve 103 may be normally biased, as by means of a spring 104, to deliver fluid to the devices 86 and 87 to actuate the same in one direction. Any suitable or preferred control means, including mechanical control mechanisms, may be provided for moving the valve, against its biasing spring, to deliver fluid to the devices 86 and 87 to actuate the same in the opposite direction. As shown, an electrically operable solenoid 105 may be provided for actuating the valve. Preferably, the valve 103 is normally biased by the spring 104 to deliver actuating fluid at relatively low pressure for the retraction of the piston rods 90 and 90', actuating fluid under high pressure being delivered through the valve 103 for the projection of the piston rods whenever the solenoid 105 becomes energized.

Fluid under pressure for the projection of the piston rods 90 and 90' may be delivered from the valve 103 through a conduit 106 having branches connected respectively through the cylinder heads 88 and 88' with the interior of the cylinders forming the devices 86 and 87. One of said branches, namely, the branch which connects with the device 87, preferably includes an adjustable fluid flow control valve 107. Actuating fluid for retracting the piston rods 90 and 90' may be delivered from the valve 103 through a conduit 106' having a branch connected preferably through an adjustable flow control valve 107' with the cylinder head 89' of the device 87, said conduit 106' having another branch connected through a control valve 108 and a delivery conduit 109 with the cylinder head 89 of the device 86. The valve 108 preferably is normally open and is drivingly connected with an operating solenoid 110 adapted, when energized, to close the valve 108.

When the device 86 is supplied with actuating fluid under high pressure by operation of the valve 103, its associated piston rod 90 may be projected to any one of three positions. The first two of these positions may be determined by selectively operable stop members 111 and 112; and the third position may be determined by the limit of projecting movement of the piston of the device 86 within its associated cylinder. Likewise, when the device 87 is supplied with actuating fluid under high pressure by operation of the valve 103, its associated piston rod 90' may be projected to any one of three positions. The first two of these positions may be determined by selectively operable stop members 111' and 112'; and the third position may be determined by the limit of projecting movement of the piston of the device 87 within its associated cylinder.

The selectively operable stop means 111 and 112 associated with the piston rod 90, and the selectively operable stop means 111' and 112' associated with the piston rod 90', may be and preferably are substantially identical structures, the same being shown in Fig. 12 and preferably comprising each an elongated member 113. The member 113 may comprise spaced longitudinal side walls 114 and a bottom wall 115 defining an open channel 116 extending longitudinally of the member 113 between the side walls 114, a pair of spaced apart adjustable stop members X–1 and X–2 being mounted adjacent the opposite ends of the member 113. The stop members X–1 and X–2 may each comprise a cylindrical pin 117. These pins may each be turnably mounted in journals comprising openings formed in the opposite side walls 114 of the channeled member 113, the bottom wall 115 of the member being formed with a semi-cylindrical cavity in alinement with the journal openings.

One cylindrical half section of each of the pins 117 may be cut away, as at 118, so that, by turning the pin to a selected relative angular position in the member 113, its remaining half section may extend, in inactive position, entirely within its associated semi-cylindrical channel formed in the bottom wall of the member 113, as shown at the right hand end of the device as illustrated in Fig. 12, thereby leaving the channel 116 entirely unobstructed by the pin. Alternately, by rotating the pin 90 degrees from such inactive position, its remaining half section may be disposed in active position extending across the channel 116, thereby forming an abutment, as illustrated at the left hand end of the device as shown in Fig. 12. Suitable arms 119 may be provided on the pins 117 to facilitate the turning of the pins between active and inactive positions.

As shown more particularly, in Fig. 10, a stop device 113 may be mounted in the main frame 31 with the channel 116 of said device in alinement with the path of movement of the carriage frame driving bracket 91, which is drivingly connected with the piston rod 90. When the stop device is so disposed, its stop members X–1 and X–2, respectively, may provide the carriage frame stops 111 and 112. When the carriage frame 67 is projected on the tracks 77 and 77′, by operation of the device 86, a portion of the bracket 91 will be caused to move longitudinally through the channel 116, and projecting movement of the carriage frame 67 may be stopped in response to engagement of the bracket 91 with either of the stop members 111 and 112, if the same be in active position. If neither of the stop members is in active position, the bracket 91 may travel past both of them, in which case projecting movement of the carriage frame 67 will be stopped when the device 86 reaches the limit of its carriage projecting movement. Accordingly, by disposing the stop members 111 and 112 in appropriate positions along the path of travel of the bracket 91, and by accurately positioning the device 86 in the assembly, longitudinal movement of the carriage frame 67 in the housing 31 may be stopped in any selected one of the picturing positions designated by the lines 83, 84 and 85.

As shown more particularly in Fig. 9, another stop device 113 may be mounted in the main frame 31 with its channel 116 in alinement with the path of movement of the bracket 91′. which is drivingly connected with the piston rod 90′. When the stop device is so disposed, its stop members X–1 and X–2, respectively, may provide the cassette carriage stops 111′ and 112′.

When the cassette carrier 62 is projected on the tracks 73, by operation of the device 87, a portion of the bracket 91′ will be caused to move longitudinally through the channel 116. As a consequence, projecting movement of the cassette carrier 62 may be stopped in response to engagement of the bracket 91′ with either of the stop members 111′ and 112′, if the same be in active position. If neither of the stop members is in active position, the bracket 91′ may travel past both of them, in which case projecting movement of the cassette carrier 62 will be stopped when the device 87 reaches the limit of its carriage projecting movement. Accordingly, by disposing the stop members 111′ and 112′ in appropriate positions along the path of travel of the bracket 91′, and by accurately positioning the device 87 in the assembly, transverse movement of the cassette carrier 62 on the frame 67 may be stopped in any selected one of the picturing positions designated by the lines 83′, 84′ and 85′.

Any suitable or preferred means, including mechanically actuated means, if desired, may be provided for moving the stops 111, 111′, 112 and 112′ between active and inactive positions. As shown, operating solenoids 111–S, 111′–S, 112–S and 112′–S may be drivingly connected, respectively, with the stops 111, 111′, 112, 112′, said solenoids being preferably biased, as by means of springs, so that the stops are normally held in inactive position, and are projectible into carriage stopping position each when its connected solenoid becomes energized.

In order to accomplish the retraction of the carriages 62 and 67 to stand-by position opposite the frame opening 61, the valve 103, when its operating solenoid 105 is de-energized, is adapted to deliver low pressure fluid to the devices 86 and 87 through the cylinder heads 89 and 89′ for the retraction of the piston rods 90 and 90′. To this end, the valve 103 may be provided with a vent opening 120 for exhausting high pressure air directly to atmosphere during retraction of the pistons 90 and 90′, the valve having a like vent opening 120′ for exhausting low pressure air directly to atmosphere during the operation of the devices 86 and 87 for the projection of the carriages 62 and 67.

The valve 108 is normally open during carriage frame projecting movement of the device 86, but may be closed by any one of several normally open microswitches 121, 122 and 123, which respectively correspond with the several projected positions of the carriage frame 67 determined by the stops 111, 112, and the projection limit of the device 86. The microswitches 121, 122 and 123 may be disposed in position to be actuated by a cam strip 124 on the carriage frame 67 so as to close the valve 108 before the carriage frame 67 reaches its selected stopping position. Such advance closure of the valve 108 is adapted to provide a low pressure air cushion to bring the mechanism gently to rest in the selected stopping position.

To this end, the microswitches are preferably carried on a switch mounting bar 125 secured in the main frame 31 in position extending longitudinally thereof, as along and inwardly of the side member 44 of the frame, means being provided for anchoring each of the microswitches in precisely adjusted position on the mounting bar 125. The cam bar 124 is adapted to close the microswitches in succession as the carriage frame 67 is projected from retracted position; but only the first microswitch 121 is closed by the cam bar if the carriage frame be projected to the position of minimum projection designated by the position line 83, switches 121 and 122 being both closed when the carriage frame is projected to the medial position designated by the position line 84, all three switches being closed when the carriage frame is projected to the position of maximum projection designated by the position line 85. In addition to the microswitches 121, 122 and 123, the system may include a microswitch 126 mounted in the frame 31 in position to be closed whenever the carriage frame 67 is in retracted or stand-by position opposite the opening 61. The cam bar 124 may conveniently be employed for so closing the switch 126. The system also preferably includes a switch 127 mounted in the frame 31 in position to be momentarily closed as the carriage frame 67 approaches its fully retracted position, the carriage frame being preferably formed with a cam member 127′ in position to so momentarily close the switch 127.

As shown more particularly in Fig. 20, selectively adjustable means 128 may be provided for automatically controlling the operation of the carriage projecting and retracting mechanism in order to accomplish projection of the cassette carrier successively into the several positions of projection illustrated in Figs. 15–18. Said selectively adjustable means may conveniently be mounted within the housing 31 adjacent its front wall 42. Said selectively adjustable means, further, may conveniently comprise a plurality of manually adjustable selector switches 129, 130, 131, 132, and 133 drivingly connected with a common shaft 134. Means, such as a manually operable knob 134′, may be provided for turning the shaft 134 in order to adjust the switches to any desired position of adjustment, said knob being preferably disposed in readily accessible position, as on the top wall 40 of the housing 31 adjacent the front end wall 42 thereof. The selector switches may be electrically interconnected with a suitable power source and the solenoids 105 and 110 which respectively control the operation of the main valve 103 and the throttling valve 108, the stop controlling solenoids 111-S, 112-S, 111'-S and 112'-S, as well as the microswitches 121, 122, 123, 126 and 127, in order to accomplish the projection and retraction of the carriages 62 and 67 in desired fashion, as in the manner illustrated in Figs. 15–18.

The switches 129, 130, 131, 132 and 133 preferably comprise twelve position rotary switches, the switch 129 having its ninth, tenth and twelfth position contacts connected with one side of the energizing winding of the solenoid 112-S, and its first, second and seventh position contacts connected with one side of the energizing winding of the solenoid 111-S. The rotary switch 130 may have its sixth, seventh and twelfth position contacts connected with one side of the energizing winding of the solenoid 112'-S, and its first, third and ninth position contacts connected with one side of the energizing winding of the solenoid 111'-S. The other sides of the energizing windings of said solenoids may be connected with a conductor 135 forming one side of a suitable power supply line, the other side of which comprises a conductor 135' which may be connected through a normally open switch 136 with the movable contacts of the selector switches 129 and 130, and also with the movable contacts of the selector switches 131 and 132.

The first, second and sixth position contacts of the rotary switch 131 may be connected with one side of the microswitch 121, the ninth, tenth and twelfth position contacts of said switch being connected with one side of the microswitch 122, while the third, fourth and seventh position contacts of said switch are connected with one side of the microswitch 123. The other sides of the microswitches are interconnected; and the energizing winding of the solenoid 110 is connected between said interconnected sides of the microswitches and the power supply line conductor 135.

All but the fifth, eighth and eleventh position contacts of the selector switch 132 may be commonly interconnected, and the energizing winding of the main valve actuating solenoid may be interconnected in series with a normally open switch 137, between the power supply line conductor 135 and said commonly interconnected position contacts of the switch 132.

The normally open switches 136 and 137, together with another normally open switch 138, may comprise the contact elements of a multiple switch relay having an operating coil 139 which, when energized, may function to cause closure of the switches 136, 137 and 138. The relay coil 139 may be interconnected between the power supply line conductors 135 and 135', in series with the normally open switch 138 and a manually operable switch 140, the microswitch 126 being electrically connected in shunt relationship with respect to the normally open switch 138.

Projection of the carriage frames may be accomplished by first adjusting the selector knob 134 to the position corresponding with the desired position of projection to be accomplished, and thereafter by closing the switch 140 in order to energize the relay coil 139 through the normally open microswitch 126 which is closed, as by the cam bar 124, when the carriage frames are in retracted position. Thus energized, the relay coil 139 closes relay switches 136, 137 and 138, thereby connecting the movable blades of the selector switches with the power supply conductor 135' through the switch 136, and energizing the main valve solenoid through the selector switch 132 and the relay switch 137, the switch 138 serving to energize the relay coil 139 after the microswitch 126 becomes open as the carriage frame 67 is moved away from stand-by position. It will be noted that the main valve solenoid 105 will not be energized in response to closure of the relay switch 137 in the event that the selector switch means be adjusted to the fifth, eighth or eleventh positions of adjustment, the same being "dead" or disconnected positions preventing actuation of the main valve for the projection of the carriage frames. Carriage frame projection, however, will be accomplished upon closure of the relay switch 137 providing the selector means 128 be set in any adjusted position other than said "dead" positions.

When the main valve solenoid is thus energized, the cassette carrier 62 will be projected on the carriage frame 67 to the extent permitted by the condition of the adjustable stops 111, 112, 111' and 112', the same being determined by the selector switches 129 and 130. In that connection, projection of the cassette carriage 62 and the carriage frame 67, in response to the positioning of the selector means 128, will be accomplished as follows:

| Selector Position | Carriage position | Condition of Control Elements | | | | | | |
|---|---|---|---|---|---|---|---|---|
| | | Stop Elements | | | | Switches | | |
| | | 111 | 112 | 111' | 112' | 121 | 122 | 123 |
| 1 | Fig. 15(a) | A | I | A | I | C | D | D |
| 2 | Fig. 15(b) | A | I | I | I | C | D | D |
| 3 | Fig. 15(c) | I | I | A | I | D | D | C |
| 4 | Fig. 15(d) | I | I | I | I | D | D | D |
| 5 | Retracted | I | I | I | I | D | D | D |
| 6 | Fig. 16(a) | A | I | I | A | C | D | D |
| 7 | Fig. 16(b) | I | I | I | A | D | D | C |
| 8 | Retracted | I | I | I | I | D | D | D |
| 9 | Fig. 17(a) | I | A | I | I | D | C | D |
| 10 | Fig. 17(b) | I | A | I | I | D | C | D |
| 11 | Retracted | I | I | I | I | D | D | D |
| 12 | Fig. 18 | I | A | I | A | D | C | D |

Where A indicates active condition of stops to position the frame 67; I indicates inactive condition of stops allowing frame to pass; C indicates connected for operation of the cushioning solenoid 110; and D indicates disconnected and hence unable to actuate cushioning solenoid 110.

It will be seen that the adjustable switch 131 will connect the microswitch 121 in position to control the operation of the throttling valve 108 when the selector means 128 is set to any of its first, second and sixth positions, the same corresponding, respectively, with the carriage positions shown in Figs. 15a, 15b, and 16a, requiring the carriage frame 67 to be stopped in the position of minimum projection represented by the line 83 and as determined by the stop 111.

It will likewise be seen that the adjustable switch 131 will connect the microswitch 122 in position to control the operation of the throttling valve 108 when the selector means 128 is set to any of its ninth, tenth and twelfth positions, the same corresponding, respectively, with the carriage positions shown in Figs. 17a, 17b, and 18, requiring the carriage frame 67 to be stopped in the position of medial projection represented by the line 84 and as determined by the stop 112.

The adjustable switch 131 will connect the microswitch 123 in position to control the operation of the throttling valve 108 when the selector means 128 is set to any of its third, fourth and seventh positions, the same corresponding, respectively, with the carriage positions shown in Figs. 15c, 15d, and 16b, requiring the carriage frame 67 to be stopped in the position of maximum projection represented by the line 85 and as determined by the limit of projecting movement of the disc 86, when both of the stops 111 and 112 are inactive.

In order to automatically condition the selector switches to carry out the carriage projecting sequences shown in Figs. 15, 16 and 17, in response to successive operation of the switch 140, means may be provided for automatically advancing the selector switches one step to the next succeeding switch position as the carriage frame 67 is retracted to stand-by position following projection to any of the positions depicted in Figs. 15, 16 and 17. Such means may also operate to adjust the selector switch mechanism to its inactive fifth, eighth and eleventh positions, respectively, upon retraction of the carriage means from the projected positions shown in Figs. 15d, 16b, and 17b. As a consequence, the apparatus will be disabled automatically after each projecting sequence has been concluded, that is to say, whenever the selector switches are in the fifth, eighth and eleventh positions.

In order to accomplish such automatic resetting of the selector mechanism, the switch 140 may be constituted as one movable pole of a double-pole, double-throw switch W, the other pole 140' of which may be electrically connected to control the operation of an actuating coil 141, which is drivingly associated with means 142 for turning the shaft 134 of the selector switch means one step to the next adjacent selector switch position each time the coil 141 is energized. Any suitable means 142 may, of course, be employed for thus turning the selector switch means. As shown, the means 142 may comprise a ratchet wheel 143 drivingly connected with the shaft 134. The ratchet wheel may be operatively associated with a shiftable arm 144 carrying a wheel driving pawl 145 and movable, when the coil 141 is energized, to cause the pawl 145 to turn the wheel 143 and the connected selector switch means through an angular displacement equal to the spacement of the several selector switch positions.

Any suitable means forming a power source may be employed for energizing the coil 141 under the control of the switch 140'. As shown, such power supply means may conveniently comprise a rectifier 146, the input side of which is electrically connected between the power supply line conductors 135 and 135', the output side of the rectifier being interconnected in series with the coil 141, and a normally open switch 147. This switch, together with another normally open switch 148 may form the contact elements of a multiple switch relay having an operating coil 149 which, when electrically energized, may cause the switches 147 and 148 to close. The relay coil 149 may be connected between the power supply lines through the normally open microswitch 127, the manual switch 140' and the selector switch element 133. To this end, all of the position contacts of the element 133 except the twelfth position contact may be connected together in common and to the switch 140', the pole of the element being connected with the coil 149. The relay switch 148 may be connected in shunt relation between the pole of the selector switch element 133 and its interconnected position contacts.

The switches 140 and 140' are arranged so that when one is closed the other is open, and vice versa. Accordingly, when the switch means W is operated to open the switch 140 to allow retraction of the carriages 62 and 67, the switch 140' will be closed in order to complete a circuit for energizing the coil 141 upon closure of the normally open microswitch 127, said microswitch being momentarily closed by the cam means 127' as the carriage frame 67 reaches retracted or stand-by position, at which instant the mechanism 128 will be indexed or advanced from one control position to the next adjacent position.

As shown, there are twelve control positions to which the selector means 128 may be adjusted. Four successive positions may correspond respectively with the projected carriage positions shown in Fig. 15. The fifth, eighth and eleventh positions may comprise inactive or "dead" settings of the adjustable apparatus. The sixth and seventh positions of adjustment may correspond with the projected carriage positions illustrated in Fig. 16, while the ninth and tenth positions of adjustment may represent the projected carriage positions depicted in Fig. 17. The twelfth position of selector switch adjustment may correspond with the single projected position of the cassette carriage illustrated in Fig. 18.

In order to operate the device for the succesisve exposure of the four quarter sections of a ray sensitive sheet, in the manner illustrated in the several views, a, b, c and d of Fig. 15, the shutter means S', by operation of theh andles 35, may first be adjusted to confine the ray beam R within an appropriate exposure field of restricted area centered in the exposure zone defined by the panel 37. Thereupon, the knob 134' may be adjusted to the appropriate initial selector position, and the apparatus may be set in operation by closure of the switch 140, said switch having an operating handle mounted preferably adjacent the knob 134', as on the top wall 40 of the housing 31. By closure of the switch 140 with the adjustable means 128 in its initial or first position of adjustment, the carriages 62 and 67 may be projected to the position illustrated in Fig. 15a.

After retracting of the carriages to stand-by position by the opening of the switch 140 and the closure of the switch 140', and the actuation of the indexing means 142 in response to the momentary closure of the switch 127, the carriages 62 and 67 may be projected to the position shown in Fig. 15b upon closure of the switch 140. Thereafter, successive operation of the switch W will result in the projection of the carriages 62 and 67 successively to the positions shown in Figs. 15c and 15d. Operation of the switch W to retract the carriages 62 and 67 from the position illustrated in Fig. 15d, however, will result in the movement of the switch means 128 to its "dead" fifth position, thereby inhibiting projection of the carriages in response to operation of the switch W.

Adjustment of the selector means 128 to either its sixth or ninth position will allow successive projection of the carriages 62 and 67 to the positions depicted in Figs. 16 and 17 in response to successive operation of the switch W for the projection and retracted of the carriages. Retraction of the carriages from the positions shown in Figs. 16b and 17b will, of course, automatically shift the selector switch means 128 to the "dead" eighth and eleventh positions, thereby inhibiting projection of the carriage means in response to operation of the switch W.

It will also be seen that if the carriage means by chance occupies a projected position when the selector switch means is adjusted to the "dead" fifth, eighth or eleventh positions, the carriage means may be retracted to stand-by position merely by operating the switch W to open the switch 140 and close the switch 140'. It will be seen, also, that, when the selector switch means is adjusted to its twelfth position, the same being the position for accomplishing carriage projection to the position shown in Fig. 18, the pawl of the selector switch element 133 will be in engagement with the disconnected twelfth position contact of said element, whereby the energizing circuit of the solenoid 149 will be interrupted. Consequently, as the carriage means is retracted from the projected position shown in Fig. 18, momentary closure of the switch 127 will fail to energize the relay coil 149 so that the switch 147 will remain open and the indexing mechanism will not be operated. Indexing thus is prevented not only when the selector means 128 is in the fifth, eighth and eleventh positions, but also when in the twelfth position. The switch 148, which is connected in parallel relationship between the pawl and interconnected contacts of the selector switch element 133, serves to maintain the indexing circuit until the stroke of the indexing means 142 is completed, even though the indexing circuit may be momentarily broken as the result of movement of the pawl of the switch element 133 from one position contact to the next succeeding contact.

Alternating current power, of course, may be supplied between the conductors 135 and 135' from a suitable power supply source 150 through suitable control equipment 151. Power for energizing the X-ray source S may also be supplied from the line comprising the conductors 135 and 135', through suitable translation equipment 152;

and the operation of the ray source S may be accomplished under the control of a switch 153, either directly or by means of suitable timing mechanism 154, the switch 153 being preferably conveniently located on the top wall 40 of the housing 31, as adjacent its forward end wall 42.

In order to operate the equipment, it is merely necessary to adjust the selector switch mechanism 128 to a desired position by means of the handle 134', then to operate the switch W to accomplish carriage projection to a desired position. After adjustment of the ray beam limiting shutters by means of the handles 35, the switch 153 may be operated to energize the ray source S for the exposure of ray sensitive material 38 supported in the carriage means. After conclusion of the exposure, the switch W may be operated to retract the carriage means and automatically to reset the selector switch means, so that by merely throwing the switch W, the carriage means may again be projected to a desired position for exposure to X-rays in response to operation of the switch 153.

A complete sequence of the sort illustrated in Figs. 15, 16 and 17 may thus be accomplished, after initial adjustment of the selector switch means, merely by successively operating the switches W and 153, the equipment being automatically disabled at the conclusion of each sequence. At any time, however, the selector switch means may be operated to any desired position, thereby interrupting a sequence then in progress, if such be desirable. When the selector switch means is set to its twelfth position, operation of the switch W will merely cause successive projection and retraction of the carriage means to and from the Fig. 18 exposure position and will not automatically advance the selector means.

An important feature of the present invention resides in the provision of fluid pressure mechanism for projecting and retracting the cassette carriage means comprising the frames 62 and 67. The employment of such fluid pressure carriage shifting means allows the carriages to be projected quickly and substantially without noise and vibration to the desired projected positions. The arrangement also includes the novel cushioning effect accomplished under the control of the valve 108 and the switches 121, 122 and 123, whereby the carriage frame 67 is brought gently to a stop in the desired projected position.

Another important feature of the invention which derives from the employment of fluid pressure carriage shifting means is that the carriage frames 62 and 67 are firmly held in projected position against limiting stops by the action of the fluid pressure motive means, it being of particular importance, in the interests of accuracy, that the carriage means be held firmly in precisely determined projected positions.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Positioning mechanism comprising frame means forming a work station, a loading station and a guide track extending between said stations, carriage means movable on said guide track between retracted position at said loading station and projected position at said work station, a cessette carrier mounted for movement on said carriage means in a direction transversely of said guide track, motor means mounted on said frame for moving said carriage means along said track between retracted and projected positions, a fluid pressure motor mounted on said frame, and driving means interconnecting said fluid pressure motor and said carrier for shifting the same on said carriage means transversely of said guide track.

2. Positioning mechanism as set forth in claim 1, wherein said driving means comprises flexible cables anchored on said frame and engaging driving rollers on the carrier and the fluid pressure motor, and guide rollers on the carriage means.

3. Positioning mechanism as set forth in claim 1, including selectively operable stops for halting carrier driving movement of said fluid pressure motor when said cassette carrier reaches a selected one of a plurality of relatively shifted positions on said carriage means.

4. Positioning mechanism comprising frame means forming a work station, carriage means movable on said frame means between a retracted position and a projected position at said station, stop means defining such projected position, fluid pressure actuated means normally conditioned to urge the carriage means in a retracting direction from said station toward said retracted position, and to hold said carriage means in retracted position, and means conditionable at will to drive said fluid pressure actuated means in a direction to move the carriage means from retracted toward projected position at said station, and to hold said carriage means firmly in projected position as defined by said stop means at said station.

5. Positioning mechanism comprising frame means forming a work station, carriage means movable on said frame means from a retracted position to a projected position at said station, fluid pressure actuated means for so moving the carriage means, stop means for disabling said fluid pressure actuated means when said carriage means reaches its projected position, said stop means comprising a normally retracted latch member, and means operable for disposing said latch member in position to latch said fluid pressure actuated means against carriage projecting movement beyond a limit determined by said latch member when in latching position.

6. Positioning mechanism comprising frame means forming a work station, carriage means movable on said frame means between a retracted position and a projected position at said station, fluid pressure actuated means for moving said carriage means between retracted and projected positions, and means operable as said carriage means approaches one of said positions for applying a fluid pressure cushion to retard movement of said carriage means, whereby to stop the same in said position gently and substantially without shock or jar.

7. Positioning mechanism comprising frame means forming a work station, carriage means movable on said frame means between a retracted position and a projected position at said station, fluid pressure actuated means for moving said carriage means toward a said position, means forming a stop for halting the carriage means when it reaches said position, and means operable by said carriage means as it approaches said position for applying a fluid pressure cushion to retard movement of said carriage means, whereby to stop the same gently and without shock as the carriage means reaches the position defined by said stop.

8. Positioning mechanism comprising frame means forming a work station, a carriage frame movable on said frame means between a retracted position and a projected position at said station, a carrier frame movable on said carriage frame in a direction transversely of carriage frame movement on said frame means, driving means for so moving said carriage frame on the frame means and said carrier frame on the carriage frame, including fluid pressure actuated means for so moving at least one of said frames, a plurality of stops cooperatively associated with said driving means and conditionable to disable the same when said carriage and carrier frames each reach a selected one of a number of relatively offset projected positions, respectively on the frame means and on the carriage frame, at said station, and selectively operable means for simultaneously conditioning a selected stop for the carriage frame and another selected stop for the carrier frame.

9. Positioning mechanism comprising frame means forming a work station, carriage means movable on said frame means from a retracted position to a projected position at said station, motive means for so moving the carriage means, a plurality of normally inactive stop members, a plurality of motor devices drivingly connected each with a corresponding one of said stop members to activate the same to stop the positioning mechanism when the carriage means reaches a corresponding projected position at said station, and adjustable control means for selectively conditioning said motor devices for operation.

10. Positioning mechanism comprising frame means forming a work station, carriage means movable on said frame means from a retracted position to a projected position at said station, motive means for so moving the carriage means, a plurality of normally inactive stop members, a plurality of motor devices drivingly connected each with a corresponding one of said stop members to activate the same to stop the positioning mechanism when the carriage means reaches a corresponding projected position at said station, and electrical circuit means for controlling the operation of said motor devices, said circuit means including multiple position switch means for selectively conditioning said motor devices for operation and a switch interconnected with said position switch means for controlling the actuation of the motor devices.

11. Positioning mechanism comprising frame means forming a work station, carriage means movable on said frame means from a retracted position to a projected position at said station, motive means for so moving the carriage means, a plurality of normally inactive stop members, a plurality of motor devices drivingly connected each with a corresponding one of said stop members to activate the same to stop the positioning mechanism when the carriage means reaches a corresponding projected position at said station, braking means operable to retard movement of said carriage means as it approaches projected position at said station, a motor for actuating said braking means, motor control elements operable in succession by said carriage means as it approaches projected position to actuate said motor, and adjustable control means for selectively conditioning said motor devices and control elements for operation.

12. Positioning mechanism comprising frame means forming a work station, a carriage frame movable on and longitudinally of said frame means between a retracted position and any one of several relatively offset projected positions at said station, a carrier frame adapted to support a ray sensitive material cassette therein, said carrier frame being movable, on said carriage frame, in a direction transversely of the direction of longitudinal carriage frame movement on said frame means, between a retracted position and any one of several relatively offset projected positions, motive means for so moving the carrier frame on the carriage frame, including a counterweight frame and motor means drivingly connected therewith for moving the same transversely of said frame means, flexible cable means drivingly interconnecting said counterweight and carrier frames, mounting pulleys for supporting said cable means on said carriage frame, and driving pulleys for connecting the cable means with said counterweight and carrier frames, the mass of said counterweight frame being substantially equal to that of said carrier frame and a cassette supported therein.

13. Positioning mechanism comprising frame means forming a work station, a carriage frame movable on and longitudinally of said frame means between a retracted position and any one of several relatively offset projected positions at said station, a carrier frame adapted to support a ray sensitive material cassette, said carrier frame being movable, on said carriage frame, between any one of several projected positions relatively offset, on said carriage frame, in a direction transversely of the direction of carriage frame movement on and longitudinally of said frame means, motive means for so moving the carrier frame on the carriage frame and the carriage frame on the frame means, including a driving frame movable by said motive means transversely of said frame means, and flexible cable means connected on said frame means and extending on guide members on said driving frame and on said carriage and carrier frames to drivingly interconnect said carrier and driving frames.

14. Positioning mechanism comprising frame means forming a work station, a carriage frame movable on the frame means between a retracted position and any one of several relatively offset projected positions at said station, a carrier frame movable on said carriage frame between a retracted position and any one of several relatively offset projected positions, on said carriage frame, in a direction transversely of the direction of carriage frame movement on said frame means, motive means for so moving the carrier frame on the carriage frame and the carriage frame on said frame means, including a switch operable to control said motive means, fixed stops defining the positions of maximum projection of said carriage and carrier frames, normally inactive stop latches in position when activated to define the other relatively offset projected positions of said carrier and carrier frames, adjustable multiple position switch mechanism for selectively conditioning said stop latches for activation, control means operable to actuate said motive means and simultaneously to activate such selectively conditioned stop latches, whereby several successive control positions of said switch mechanism may control projection of the carrier frame to successively different offset projected positions of the carrier frame forming a carrier frame projection sequence, and means actuated by the return of said carriage frame to retracted position for shifting said mechanism from one position to its next adjacent control position.

15. Positioning mechanism as set forth in claim 14, wherein said switch mechanism is arranged to provide open circuit conditions preventing projection of the carriage and carrier frames at the conclusion of a carrier frame projection sequence.

16. Positioning mechanism as set forth in claim 14, wherein said switch mechanism provides a plurality of active positions each allowing projection and retraction of the carriage and carrier frames in response to operation of said control means, said active positions being arranged as groups each comprising a plurality of successive positions, and said switch mechanism providing a dead or inactive position terminating each active position group.

References Cited in the file of this patent

UNITED STATES PATENTS

| | | |
|---|---|---|
| 2,291,139 | Borthwick | July 28, 1942 |
| 2,552,858 | Mueller et al. | May 15, 1951 |
| 2,668,913 | Goldfield et al. | Feb. 9, 1954 |
| 2,709,221 | Haupt et al. | May 24, 1955 |
| 2,749,445 | Stava et al. | June 5, 1956 |

FOREIGN PATENTS

| | | |
|---|---|---|
| 101,617 | Sweden | May 20, 1941 |